United States Patent
Haines et al.

(10) Patent No.: US 8,055,942 B2
(45) Date of Patent: Nov. 8, 2011

(54) DATA STORAGE DEVICES AND METHODS FOR POWER-ON INITIALIZATION

(75) Inventors: Jonathan W. Haines, Boulder, CO (US); Brett A. Cook, Longmont, CO (US); Gabriel Ibarra, Longmont, CO (US); Peter Vasiliev, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 56 days.

(21) Appl. No.: 12/630,386

(22) Filed: Dec. 3, 2009

(65) Prior Publication Data

US 2011/0138222 A1 Jun. 9, 2011

(51) Int. Cl.
*G06F 11/00* (2006.01)
(52) U.S. Cl. .......................... 714/16; 714/6.1
(58) Field of Classification Search .................. 714/16, 714/6.1, 6.12, 6.13, 36, 2
See application file for complete search history.

(56) References Cited

U.S. PATENT DOCUMENTS

| | | | |
|---|---|---|---|
| 5,963,473 A * | 10/1999 | Norman | 365/185.02 |
| 7,089,349 B2 * | 8/2006 | Chang et al. | 711/103 |
| 7,171,594 B2 * | 1/2007 | Wyatt et al. | 714/704 |
| 7,321,951 B2 * | 1/2008 | Wong et al. | 711/103 |
| 2005/0174849 A1 | 8/2005 | In et al. | |
| 2007/0174682 A1 * | 7/2007 | King | 714/8 |

* cited by examiner

*Primary Examiner* — Dieu-Minh Le
(74) *Attorney, Agent, or Firm* — Hollingsworth & Funk, LLC

(57) ABSTRACT

Methods and systems are disclosed to generate a data map for a data storage device. A data map may be generated by scanning, during a power-on initialization process, data units of data stored on a data storage medium of a data storage device. The scanning may start from a selected data unit and proceed through the data units in an order opposite to a write order to identify a first data unit that is not fully erased. Also, an error recovery status of the first data unit may be determined based on an error correction code. A likely erased status of the first data unit may be assigned when the determined error recovery status is unrecoverable.

20 Claims, 4 Drawing Sheets

DATA STORAGE DEVICES AND METHODS FOR POWER-ON INITIALIZATION

BACKGROUND

During power-on initialization of solid state storage devices, such as Flash memory devices, a data map can be verified and updated. The verification and updating can take considerable time and resources to perform. Therefore, an improved system and method of power-on initialization is needed.

SUMMARY

In one embodiment, a method comprises, during a power-on initialization process, scanning data units of data stored on a data storage medium of a data storage device starting from a selected data unit and proceeding through the data units in an order opposite to a write order to identify a first data unit that is not fully erased. The method also includes determining an error recovery status of the first data unit based on an error correction code and assigning a likely erased status to the first data unit when the determined error recovery status is unrecoverable.

In another embodiment, a data storage device comprises a hardware controller to generate a data map associated with a data storage medium. The hardware controller may be configured to scan data units of data stored on the data storage medium starting from a selected data unit and proceeding through the data units in an order opposite to a write order to identify a first data unit having a number of bits with values that are not indicative of erasure, determine an error recovery status of the first data unit based on an error correction code, and assign a likely erased status to the first data unit when the determined error recovery status is unrecoverable.

In yet another embodiment, a device comprises a hardware controller configured to generate a data map of a data storage medium. The hardware controller may be configured to scan data units on the data storage medium in an order opposite to a write order starting from a last data unit to identify a first data unit that is not fully erased. The hardware controller may also be configured to determine a codeword for the first data unit, determine a difference between the codeword and a specific state, compare the difference to a threshold, and assign a likely erased status to at least a sector of the first data unit when the first data unit is not fully erased and the difference is less than a threshold.

DETAILED DESCRIPTION OF ILLUSTRATIVE EMBODIMENTS

Figure 1:
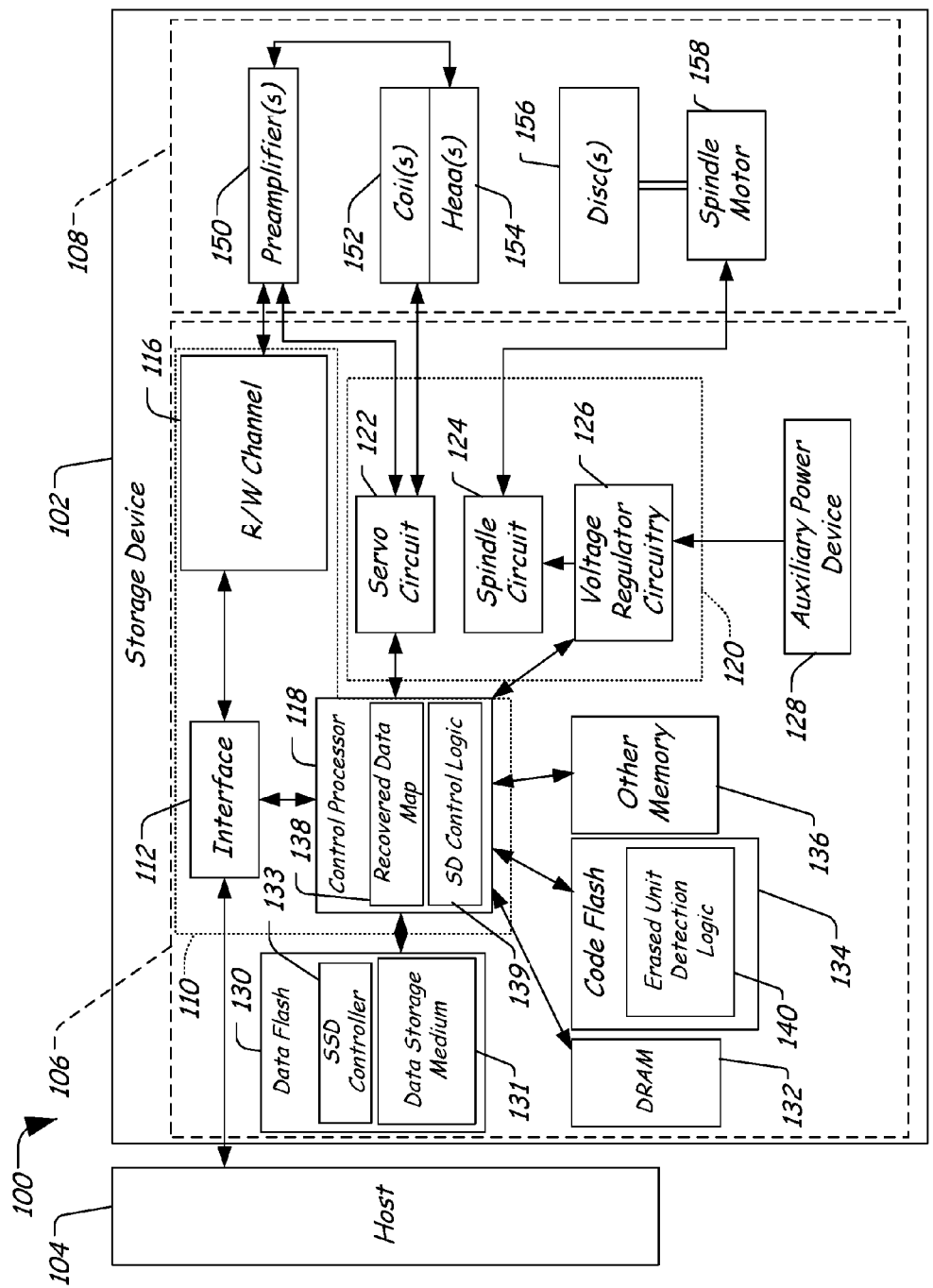
FIG. 1 is a block diagram of a particular illustrative embodiment of a system including a data storage device having hardware to perform a power-on initialization.

When power is removed from a data storage device unexpectedly, data stored on the data storage medium may include errors. In some instances, erasure blocks may not be erased completely or a data write operation may have been interrupted, resulting in partially erased data blocks or unrecoverable data. After the power is restored, a power-on initialization process may be performed in order to rebuild a data map associated with data stored on a data storage medium of the data storage device. A data map can indicate an erasure status of each erasure block of the data storage medium. This will allow a controller to have information available to know which erasure blocks are available to store new data. In addition, the data map may include information about errors or potential errors in the data storage medium.

One technique for rebuilding the data map includes updating a data map with changes before any user data is written to re-mapped regions on the data storage medium. During the power-on initialization process, data recovery may be confined to those areas of the data map that were updated just before the power loss event. However, operational performance of such a storage device may suffer unless the storage device has a fast-write non-volatile memory available for storing the data map information, which non-volatile memory may be a phase-change memory or a battery (or capacitor)-backed random access memory (RAM) with hardware that copies contents to a flash device if power is lost.

Another technique for recovering the data map information after an unexpected power loss includes scanning the data storage medium to rebuild an up-to-date data map. However, such scanning may be relatively time-consuming, since each possibly-user-written, wear-leveled, or error-recovered location for data may be examined to rebuild the data map. This scanning-for erasure during power-on recover may be so time-consuming as to exceed a time-to-ready target for a particular data storage device, which may result in a user-detectable latency that is undesirable for such storage devices.

In some instances, it may be possible to perform some data map recovery processes in the background after power-on. In such instances, the data storage medium can be scanned to rebuild the mapping data, and the scanning operations can be prioritized to recover mapping information that is needed for handling a read or write command issued from a host system, such as a processor of a computing system. However, such an implementation may introduce additional layers of design complexity.

Further, while a single-layer cell (SLC) flash memory devices may contain all one values for data regions that are erased, some vendors, such as Micron Technology Inc., manufacture flash memory devices that may not force all bits to an erased state when an erasure block is erased and that also may not program all desired zero (0) bits to a set state when programmed. While such techniques may reduce erase and program times with only a slight impact on bit error rates, such techniques may also introduce complexity because the solid-state device has to disambiguate logic levels for data units that may contain "likely erased" data.

Embodiments of data storage devices and methods for power-on initialization described below may be utilized to provide recover a data map within a desired period of time, even in cases where there is a significant amount of data scanning is needed in order to rebuild the data map. In a particular embodiment, a hardware controller of the data storage device may be configured to scan data units of a data storage medium in an order opposite to a write address order to identify a first data unit that is not fully erased. The hardware controller may determine whether the first data unit unrecoverable and may assign a status of likely erased to the first data unit when it is determined to be unrecoverable.

FIG. 1 is a block diagram of a particular illustrative embodiment of a system 100 including a data storage device 102 having hardware to perform a power-on initialization. The data storage device 102 is a hybrid data storage device that includes both rotating data storage media and solid-state data storage media. As used herein, the term "solid-state data storage device" may refer to a data storage device, such as a flash memory device, that is adapted to read and write data to an associated data storage medium without moving parts. As used herein, the term "solid-state data storage medium" refers to a recording medium comprised of single or multiple-level cells, charge traps, or other data storage units, which can be configured to store data and which is included within a solid-state data storage device.

The hybrid data storage device 102 may communicate with a host system 104 via a communications link, such as a universal serial bus (USB) communications link, a wireless (radio frequency) communications link, or another type of connection. In a particular embodiment, the host system 104 can be a computer, a processor, a personal digital assistant (PDA), another electronic device, or any combination thereof. In some embodiments, hybrid data storage device 102 may be included within host system 104 to store user data and applications that are executable by a processor (not shown) of the host system 104.

The hybrid data storage device 102 may include recording subsystem circuitry 106 and a head-disc assembly 108. Recording subsystem circuitry 106 may be configured to communicate data between host system 104 and data storage media, such as discs 156 and/or data flash 130. Recording subsystem 106 may include storage device read/write control circuitry 110 and disc-head assembly control circuitry 120. The recording subsystem circuitry 106 may include interface circuit 112 to communicatively couple to host system 104.

Interface circuit 112 may include a data buffer for temporarily buffering data received from host system 104 or data received from read/write channel 116 for communication to host system 104. Interface circuit 112 may also include a sequencer for directing the operation of the read/write channel 116. In some embodiments, interface circuit 112 may include logic to handle format conversions between a format associated with a communications link between storage device 102 and host system 104 and a native format associated with storage device 102. For example, interface circuit 112 may buffer and package data for transmission over a wireless communications link. In a particular embodiment, interface circuit 112 may include a wireless transceiver for communicating with host system 104 via a radio frequency communication channel. In another embodiment, interface circuit 112 may be coupled to a network and may be accessible to one or more computing systems, such as host system 104, through the network.

Recording subsystem circuitry 106 may also include control processor 118, which may be configured to execute computer-readable instructions stored in code flash 134, for example. Control processor 118 may include data map 138 including logical block addresses and erasure block addresses associated with a data storage medium of data flash 130 and/or of discs 156. Additionally, control processor 118 may include storage device control logic 139 to control operation of the hybrid storage device. Control processor 118 is coupled to a servo circuit 122, which controls the position of one or more read/write heads 154 relative to discs 156 as part of a servo loop. In an embodiment, the read/write heads 154 may be mounted to a rotary actuator assembly to which a coil 152 of a voice coil motor (VCM) may be attached. The VCM may include a pair of magnetic flux paths between which the coil 152 is disposed so that the passage of current through the coil causes magnetic interaction between the coil 152 and the magnetic flux paths, resulting in the controlled movement of the actuator assembly and the movement of the one or more heads 154 relative to surfaces of discs 156. The servo circuit 122 may be used to control the application of current to the coil 152, and hence the position of the heads 154 with respect to the tracks of discs 156.

In a particular embodiment, the disc-head assembly control circuitry 120 may include the servo circuit 122, which is configured to control preamplifiers 150 and coils 152. Further, disc-head assembly control circuit may include a spindle circuit 126, which may be coupled to a spindle motor 158 to control the rotation of discs 156. Further, disc-head assembly control circuitry 120 can include voltage regulator circuitry 126 to provide power to control processor 118, spindle circuit 124, and other circuitry.

In some embodiments, hybrid storage device 102 may also include an auxiliary power device 128, which may be coupled to voltage regulator circuitry 126 of the disc-head assembly control circuitry 120. Auxiliary power device 128 may be a capacitor or a battery configured to provide a temporary power supply to the hybrid storage device 102 under certain operating conditions, such as when external power is unexpectedly lost. In a particular example, the auxiliary power device 128 may provide a power supply to the recording subsystem assembly 106 and to the disc-head assembly 108 to record data to the discs 156 and/or data flash 130 when external power is lost.

Additionally, the hybrid storage device 102 can include data flash 130, dynamic random access memory (DRAM) 132, code flash 134, other memory 136, or any combination thereof. In a particular embodiment, code flash 134 stores erased data unit detection logic 140, which can be loaded and executed by the control processor 118 to manage reconstruction of the data map 138 after a power loss event.

In an embodiment, the data flash 130 may include a solid-state device (SSD) controller 133 that is adapted to utilize erased status detection logic 131 within the data flash 130 to perform a power-on initialization. In an example, the SDD controller 133 may include read/write circuitry or other hardware control circuitry, which may be adapted to scan pages stored on a storage medium of the data flash 130 starting from a selected page and to proceed through the pages until a first page is detected that is not fully erased. SSD controller 133 may process the first page to determine whether it is recoverable or unrecoverable and may assign an erased status to the page or to a portion of the page. If the page is recoverable, SSD controller 133 may use ECC correction logic to correct the page and may also update data map 138 with respect to the status of the page. If the page is unrecoverable, SDD controller 133 may assign a "likely erased" status to the page. If a sufficient number of next pages in a scan order are determined to be "likely erased" or "fully erased," the status of the first page may be promoted to a "fully erased" status.

The promotion to "fully erased" status may require more than just a single page of evidence. In addition, the promotion may allow some "not (LikelyErased OR FullyErased)" pages between the candidate page and the supporting evidence. An example would be where the flash controller is aware of the fact that full-page defects exist, where some pages cannot be either erased, programmed, or perhaps neither. In this case, if the controller's "normal operating mode" logic allows one and only one of these between valid pages, then the promotion logic would allow one and only one "not erased" page between the candidate page and the supporting evidence, without prejudice. In this type of case, an embodiment may include extra checking that can be performed on the "not erased" page, such as checking to see if uncorrectable data is therein (which would be expected), or whether the page appears to have valid data in it, which would support the logic in making a decision that this interstitial page is evidence that the "likely erased" page is just that, and not appropriate to promote to "fully erased".

Figure 2:
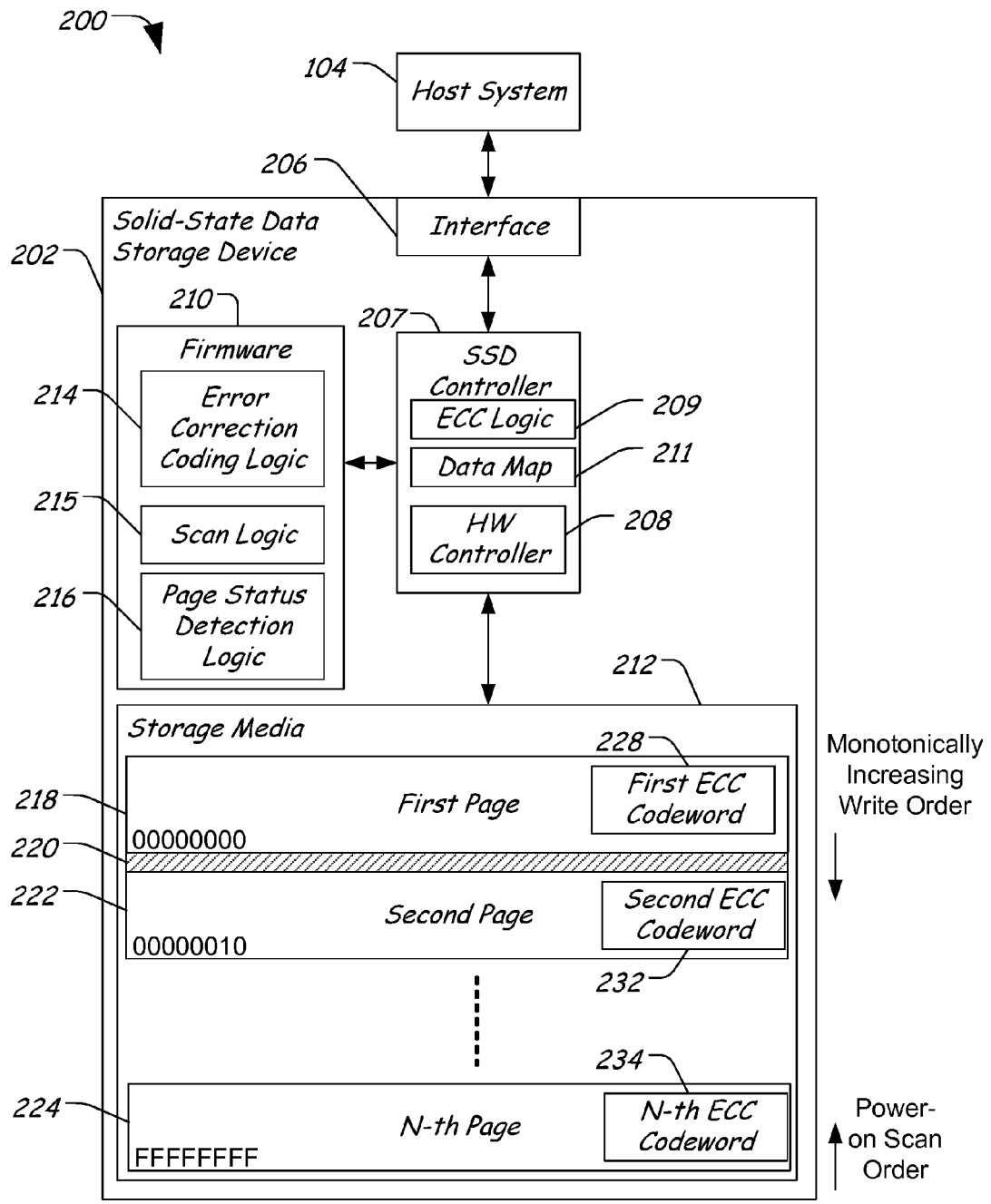
FIG. 2 is a block diagram of a second particular illustrative embodiment of a system including a data storage device having hardware to perform a power-on initialization.

FIG. 2 is a block diagram of a second particular illustrative embodiment of a system 200 including solid-state data storage device 202, such as data flash 130 depicted in FIG. 1, having hardware to perform a power-on initialization. In this embodiment, data storage device 202 is configured to communicate directly with host system 104.

Solid-state data storage device 202 includes interface 206, which may be communicatively coupled to host system 104 via a wired connection or a radio frequency communication channel, depending on the implementation. In an embodiment, interface 206 may include a connector to receive a cable to couple to host system 104. In another embodiment, interface 206 may include a radio frequency transceiver and an associated antenna (not shown) for wireless communication with host system 104.

Further, solid-state data storage device 202 includes a solid-state device (SSD) controller 207 including error correction code (ECC) logic 209, which may be loaded from firmware 210. SSD controller 207 may be configured to control operation of solid-state data storage device 202, including read/write operations, access controls, data processing, and the like. Additionally, SSD controller 207 may include hardware controller 208, which may be configured to perform a power-on initialization process.

Solid-state data storage device 202 further includes data storage media 212, which is adapted to record units of data, such as data blocks or pages. In an example, data storage media 212 may store first page 218, second page 222, and n-th page 224. Such pages may be provided to storage media 212 by SSD controller 207 and written to storage media 212 by hardware controller 208 in a write order, such as a monotonically increasing or decreasing memory address order. Pages stored in the data storage media 212 may be separated by page boundaries, such as page boundary 220. Such boundaries may be physical boundaries defined by data storage structures, such as cells, within the data storage media 212 or may be logical boundaries separating data units. In either event, it should be understood that pages 218, 222, 224, and boundary 220 are depicted for illustrative purposes, and are not drawn to scale.

Firmware 210 includes error correction coding logic 214, which may be executed by SSD controller 207 to load ECC logic 209 and to calculate ECC codewords for each page written to data storage media 212. For example, ECC logic 209 is used to calculate first ECC codeword 228 associated with first page 218, second ECC codeword 232 associated with second page 222, and third ECC codeword 234 associated with N-th page 224.

Firmware 210 further includes scan logic 215 and page status detection logic 216, which may be executed by SSD controller 207 to control a data map reconstruction process during a power-on initialization. In particular, scan logic 215 causes hardware controller 208 to scan pages on the data storage media 212. Scan logic 215 may identify a start page at which the hardware controller 208 is to begin scan operations and may specify a scan order, such as an order opposite to the write order. In an example, scan logic 215 may specify that hardware controller 208 begin by scanning a last page (such as N-th page 224) and proceed in order through the pages until a page is detected that is not fully erased.

Additionally, firmware 210 includes page status detection logic 216, which may be executed by SSD controller 207 to determine an error recovery status for the detected page. In particular, page status detection logic 216 may specify a threshold that can be used by SSD controller 207 and/or hardware controller 208 to determine whether a data unit is fully erased and/or whether a non-erased data unit includes too many errors for the ECC logic to recover the data.

In an embodiment, hardware controller 208 may examine the raw data recovered from data storage medium 212. Hardware controller 208 may compute error correction code (ECC) syndromes and may count a number of data units that appear to be in a state that is not indicative of erasure. If all of the storage units of a selected page or data block of the data storage medium 212 appear to be erased, the hardware controller 208 can indicate this to the SSD controller 207.

Additionally, the hardware controller 208 can examine the read codeword, such as N-th ECC codeword 234, from a particular storage unit, such as N-th page 224, to determine if the particular storage unit can be corrected. Since SSD controller 207 generates the ECC syndromes, it may be known to hardware controller 208 what ECC was used to generate the codewords. In particular, page status detection logic 216 may be executed by SSD controller 207 and/or by the hardware controller 208 to calculate a difference, or a distance, between a read codeword, such as the n-th codeword 234, and an all-erased state. The difference may be a count of the number of bits that are different from the all-erased state. The difference, or distance, may then be compared to a threshold. The threshold may be based on the error correcting capability of the ECC syndrome used to generate the codeword.

If the difference exceeds the threshold, then the selected data unit is presumed to be erased. If the difference is less than the threshold and the read codeword is not correctable, hardware controller 207 may assign a "likely erased" status to the data unit. In a particular embodiment, hardware controller 208 may compare a read codeword to an all-erased state to determine whether the read codeword has bits that are not fully erased and then may examine the number of correctable bits within the read codeword to determine if the storage unit is recoverable. If the data unit is not fully erased and not recoverable, the data unit may be assigned a "likely erased" status.

By utilizing hardware controller 208 to assign one of a fully erased, likely erased, recoverable, or unrecoverable status to information retrieved from storage medium 212, such determinations can be made with little performance penalty over that of reading data from the data storage medium 212. However, a solid-state data storage device lacking such hardware may need to perform various comparisons using the recovered data to determine if the data is fully erased, likely erased, recoverable, or unrecoverable. These states may mean different power-on recovery behavior. For example, if a page write was in progress when power was removed, all pages in an erasure block (EB) above the page that was being written may still be erased, and all pages below the page that was being written may be "written as they could have been," when the solid state data storage device writes the pages in monotonically-increasing number order.

When a multi-level cell (MLC) flash is used that may have more than one bit per cell, multi-bit errors may be seen due to the fact that a bad or marginal cell will cause more than one bit to be in error. Such multi-bit errors may be mitigated in many (but not all) circumstances, if the flash vendor is Gray-coding their voltage levels (meaning that they include logic to disambiguate between voltage levels) and if the internal error is small enough to only move the cell's reported voltage by one level.

In some embodiments, the hardware controller 208 may be configured by firmware 210 with information about the number of levels in the flash cell and with offset information from the start of the codeword to the first full flash cell. Such cell information and offset information makes it possible for the hardware controller 208 to maintain synchronization of the ECC's data units to the flash cell boundaries, such as boundary 220.

Whether this offset information is provided by a flash vendor, or deduced by the flash chip customer, knowledge of the alignment of MLC cells to the bits seen at the SSD format-handling layer (i.e., at the SSD controller 207 or the hardware controller 208) may enhance performance. By configuring the hardware controller 208 to be cognizant of the number of bits per cell and the alignment of a given block that is desired to be read out of the data storage medium 212, the hardware controller 208 can count the number of cells that appear erased, rather than the number of bits that appear erased. Since cell structures are closer to the physical reality of data units, counting such cells may provide better (unbiased) information about "likely erased" data units that could contain codewords, which may be sought at the SSD controller 207.

In some instances, non non-binary codes may be used for correction of data stored in MLC flash, which may be bit-aligned to the physical cell level. Such non-binary codes can allow the number of non-erased cells to map cleanly onto the bit error correction capability of the hardware controller 208 or the SSD controller 207, so that regardless of the cell's amplitude of error, error correction only consumes one symbol's worth of correction capability.

Alternatively, the channel encoding for MLC storage can employ Gray-coding to ensure that a single-level error presents itself to the ECC as a single-bit ECC error when the MLC flash cell suffers a minor voltage error. Even if this encoding is not done by the flash vendor, the flash customer can either acquire the channel coding information from the flash supplier or deduce it from cell errors seen for all programmed cell values.

In addition, if the hardware controller 208 accumulates the error information into a packed status array about sets of potential codewords, the SSD controller 207 can use this concise, efficient information to drive data transfer decisions without requiring much overhead. For example, two-bits may be used to represent the status of each sector read as follows:
  00: Correctable
  10: Likely Erased (also Uncorrectable)
  01: Fully Erased (also Uncorrectable)
  11: Uncorrectable (not Fully/Likely Erased)

In this instance, a packed bit-field containing zeros would confirm no read problems in a single instruction. In contrast, a bit field of 0110110000 would indicate that the first two sectors in a page had no errors, then the next sector was uncorrectable, then two sectors appeared likely/fully erased. Such a packed bit-field may indicate loss of power during a programming of the third sector.

In an embodiment, utilization of hardware controller 208 may reduce data transfers over a with "likely erased" indication being returned by the SSD controller 207 based on execution of the ECC logic 209, presumably based on a smaller non-erased tolerance of the hardware controller 208 as compared to the ECC logic 209. In this example, a smaller non-erased tolerance for the hardware controller 208 may provide as much as a 3× improvement in power-on response time with asynchronous flash, and as much as a 33% or more response time improvement with double data rate (DDR) synchronous flash.

Figure 3:
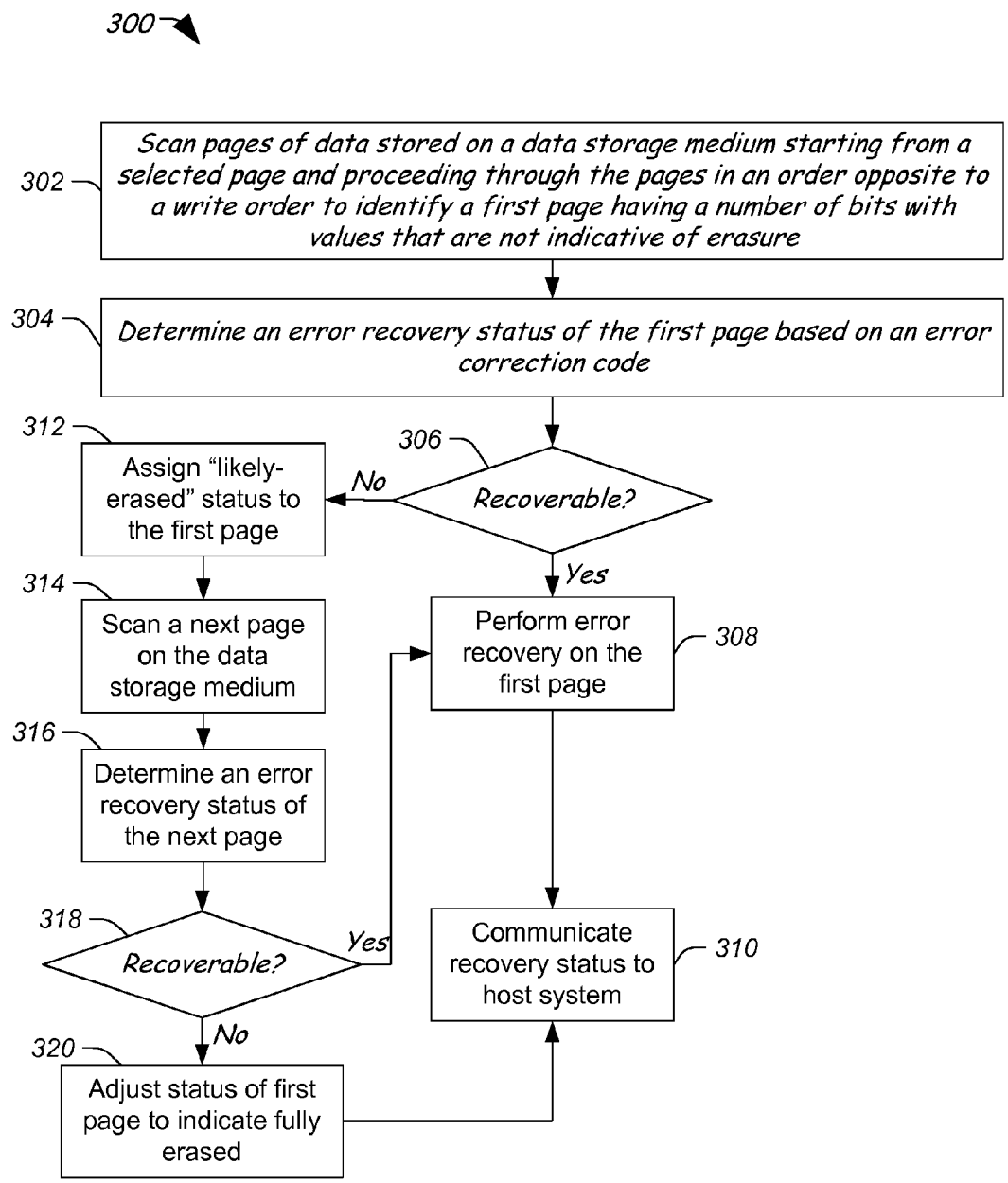
FIG. 3 is a flow diagram of a particular illustrative embodiment of a method of performing a power-on initialization.

FIG. 3 is a flow diagram of a particular illustrative embodiment of a method 300 of performing a power-on initialization. Power-on initialization may be performed by an SSD controller including hardware to scan a solid-state data storage medium, such as the SSD controller 208 depicted in FIG. 2 or the SSD controller 133 depicted in FIG. 1. At 302, pages of data stored on a data storage medium are scanned starting from a selected page and proceeding through the pages in an order opposite to a write order to identify a first page having a number of bits with values that are not indicative of erasure. In an example, if erased blocks are re-programmed to all one values, a data unit or block having values that are not all ones may indicate that the block has not been erased or that the block stores data that may be recoverable. In a particular example, the pages may be scanned in a reverse-write order starting from the last page until a page is encountered that is either unrecoverable or recoverable.

Advancing to 304, an error recovery status of the first page is determined based on an error correction code. In an example, the recoverability of the page may be determined based on the ECC technique used. One technique for determining the recoverability may be a distance check. For example, such a "distance" check for a T=8 Bose, Chaudhuri and Hocquenghem (BCH) code that is in a CFC=3 very-large-scale integration (VLSI) Internet Protocol (IP) block may include comparing a recovered codeword to a threshold or to an all erased codeword. When T=8 encoding is performed, the "all erased" state is more than a distance of 8 from any other codeword. Therefore, if ECC correction is run with T=5 correction, any codewords that are 3 bits or more from "all erased" may be identified as uncorrectable (unrecoverable) and may safely be reported as having a likely erased status.

At 306, if the page is recoverable, the method advances to 308 and error recovery may be performed on the page. Moving to 310, the recovery status of the page may be communicated, for example, to the host system, such as by updating a data map.

Returning to 306, if the page is not recoverable, the method proceeds to 312 and a likely erased status may be assigned to the page. Continuing to 314, a next page may be scanned on the data storage medium. Advancing to 316, an error recovery status of the next page may be determined. At 318, if the next page is recoverable, the method proceeds to 308 and error recovery may be performed on the page. Otherwise, the method continues to 320 and the status of the first page may be adjusted (promoted). In some instances, the status of the first page may be promoted to "fully-erased" for all purposes.

In block 320, the likely erased status of the first page may be further qualified by the finding that the next page is either fully or likely erased, in which case the "likely" indication may be promoted by the hardware controller to an "Erased" status from the perspective of the data recovery process. If the storage device is configured to use a "good-enough" programming/erasing strategy which may or may not re-program erased bit values to all one values, an SSD controller may be configured to treat the page as Fully Erased in all ways.

Figure 4:
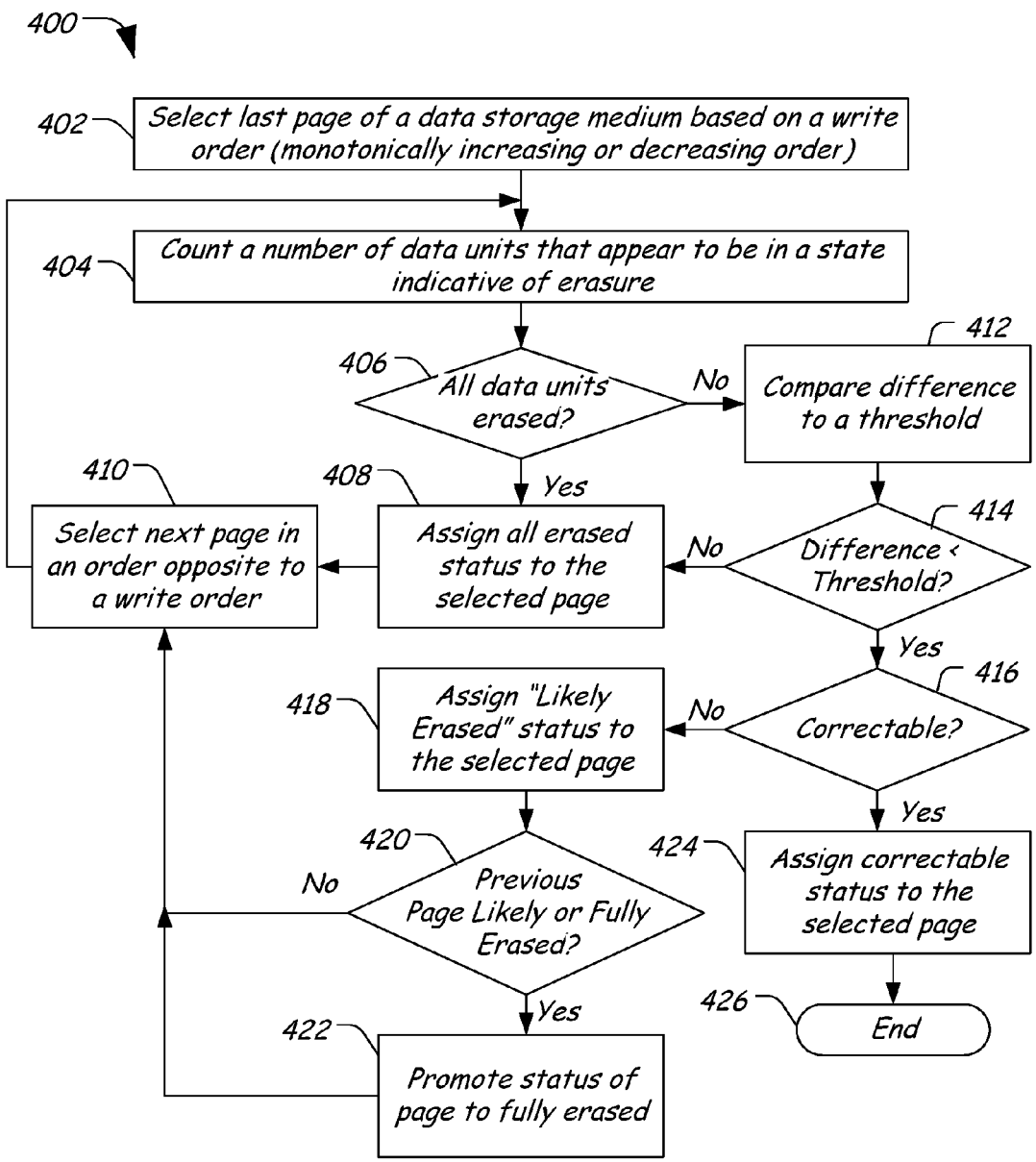
FIG. 4 is a flow diagram of a second particular illustrative embodiment of a method performing a power-on initialization including detecting an erasure status of pages stored on a data storage medium.

FIG. 4 is a flow diagram of a second particular illustrative embodiment of a method 400 performing a power-on initialization including detecting an erasure status of pages stored on a data storage medium. At 402, a last page of a data storage medium may be selected based on a write order (monotonically increasing or decreasing order). Advancing to 404, a number of data units that appear to be in a state indicative of erasure may be counted. At 406, if all units are erased, the method proceeds to 408 and an all erased status may be assigned to the selected page. Continuing to 410, a next page may be selected in an order opposite to the write order and the method returns to 404.

Returning to 406, if the data units are not all erased, the method proceeds to 412 and a codeword of the selected page may be compared to a specific state, such as an "all-erased" state, to determine a difference which may then be compared to a threshold. The difference may be a count of the number of bits that are different from the specific state. In a particular embodiment, the difference may be a count of the number of bits that are different from the all-erased state. At 414, if the difference is greater than or equal to the threshold, the method advances to 408 and an all erased status may be assigned to the selected page.

Otherwise, at 414, if the difference is less than the threshold, the method advances to 416 and the system may determine if the page is correctable. This may be accomplished based on the correction capability of the ECC syndrome used to generate the codeword. If the page is not correctable, the method proceeds to 418 and a likely erased status may be assigned to the selected page. The method proceeds to 420, and if the previous page is likely or fully erased, the method advances to 422 and the status of the selected page may be promoted to a fully erased status. Otherwise, if the previous page is not indicated to be likely or fully erased, the method advances to 410 and a next page may be selected.

Returning to 416, if the codeword is correctable, that is the ECC is capable of correcting the codeword, the method proceeds to 424 and a correctable status may be assigned to the selected page. The method then terminates at 426.

It should be understood that the methods 300 and 400 depicted in FIGS. 3 and 4 may be performed iteratively until the data map for the entire data storage medium is rebuilt. In some instances, a state of the data map may be recovered by the storage device controller and provided to the hardware controller, allowing the hardware controller to begin scanning at a page other than the last page. For example, if the storage device is configured to update a data map before performing operations on the data storage medium, the data map may identify sectors of the data storage medium that may have been interrupted during re-programming. In a particular example, if a state of the data storage map provided by the storage device controller indicates that an erasure was performed on a particular sector just before the power loss event (based on a time stamp for example), the data storage device controller may control the hardware controller to begin the power-on initialization (scan) process starting from a page just after the page that was indicated to be re-programmed, allowing the hardware controller to prioritize the rebuild operation beginning with pages that are most likely to have data errors due to the power loss event.

In another particular example, the storage device could also have a defect-management policy that ensures that if there is more than one uncorrectable-after-writing (defective) page in an EB, the entire EB is mapped out as defective, which could allow a binary search on an EB at power-up, to find the most-recently programmed page. This is another example of beginning scanning at something other than the last page. The storage device could binary-search to find the first non-erased page, then check nearby to find out if it is simply an allowable "defect" or if it is a page that may have had its programming interrupted by power loss. If it is an allowable "defect", the storage device may either scan forward to find the split-point or re-binary-search, which may include recalling that this page should not be treated as "erased".

In some instances, flash memory device vendors may embed "test for erasure" opcodes, which allow similar testing for erasure to be performed when executing an erasure opcode. In this instance, the opcode may be executed by the hardware controller to test the entire erasure block for "sufficient erasure" without having to read every page. Such a process could include cell-voltage-averaging and comparison to a threshold, sampling of pages' erasure state (possibly also by cell-voltage-averaging), or detection of high-frequency content when scanning the voltages in cells (particularly if a data randomizer is used in the solid-state data storage device). Such opcodes may provide an order-of-magnitude speedup with respect to the scanning of possibly-erased erasure blocks on power-up. Channel randomization could be applied by the controller during normal operation to the data that is stored to flash, to ensure that programmed pages have a substantially-moderate average cell voltage.

In conjunction with the systems and methods described above, a hardware controller of a solid-state data storage device is disclosed that is configured to scan pages of a data storage medium in reverse write order (i.e., in a scan order that is opposite to a write order) to identify a first data unit that is not fully erased. The hardware controller may then determine whether the data unit is recoverable and, if not, assign a likely erased status to the data unit.

While the above-discussion has largely described the data units in terms of pages, it should be understood that the data storage medium may record data in any type of storage unit. As used herein, the term "storage unit" is used to refer to a logical block of storage on a particular data storage medium. For example, in a flash memory device, the term "storage unit" may refer to a page or group of pages within the flash memory. In an object-based data storage device, the term "storage unit" may refer to an object. In a block-based data storage device, the term "storage unit" may refer to a block of data having a size defined by the interface. While data storage media 212 in FIG. 2 is depicted as having pages of data 218, 222, and 224, it should be understood that data storage media 212 may utilize any of the above-types of storage units.

It is to be understood that even though numerous characteristics and advantages of various embodiments of the invention have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the data storage system while maintaining substantially the same functionality without departing from the scope and spirit of the present disclosure.

What is claimed is:

1. A method comprising:
during a power-on initialization process, scanning data units of data stored on a data storage medium of a data storage device starting from a selected data unit and proceeding through the data units in an order opposite to a write order to identify a first data unit that is not fully erased;
determining an error recovery status of the first data unit based on an error correction code; and
assigning a likely erased status to the first data unit when the determined error recovery status is unrecoverable.

2. The method of claim 1, wherein the selected data unit comprises a last data unit of the data storage medium.

3. The method of claim 1, wherein determining the error recovery status comprises:
  determining a codeword for the first data unit;
  comparing the codeword to a specific state;
  determining a difference between the codeword and the specific state;
  determining the error recovery status as unrecoverable when the codeword is not recoverable; and
  assigning the likely erased status to the codeword when the difference is less than a threshold and the error recovery status is unrecoverable.

4. The method of claim 3, wherein the specific state is an all erased state.

5. The method of claim 3, further comprising the codeword generated using an error correction code syndrome of a T=8 Bose, Chaudhuri and Hocquenghem code, and wherein, when the difference is three bits or more different from an all-erased state, the first data unit is unrecoverable.

6. The method of claim 1, further comprising providing an indicator related to the assigned status to a storage device controller.

7. The method of claim 1, further comprising:
  scanning a next data unit in the order opposite to the write order;
  determining an error recovery status of the next data unit; and
  adjusting the error recovery status of the first data unit to a fully erased status when the next data unit has an error recovery status of unrecoverable.

8. The method of claim 1, wherein the data storage device comprises a multi-level cell solid-state data storage device.

9. A data storage device comprising:
  a hardware controller to generate a data map associated with a data storage medium, the hardware controller configured to:
    scan data units of data stored on the data storage medium starting from a selected data unit and proceeding through the data units in an order opposite to a write order to identify a first data unit having a number of bits with values that are not indicative of erasure;
    determine an error recovery status of the first data unit based on an error correction code; and
    assign a likely erased status to the first data unit when the determined error recovery status is unrecoverable.

10. The data storage device of claim 9, further comprising a storage device controller coupled to the hardware controller and configured to control access to the data storage medium and control operation of the hardware controller to retrieve the data map after a power loss event.

11. The data storage device of claim 10, further comprising the data storage medium and an interface adapted to communicate with a host system, the interface coupled to the storage device controller.

12. The data storage device of claim 11, wherein the data storage medium comprises a solid-state data storage medium, and wherein the hardware controller comprises read/write circuitry to read data from and to write data to the data storage medium.

13. The data storage device of claim 9, wherein the hardware controller is configured to generate the data map during a power-on initialization.

14. The data storage device of 13, wherein the hardware controller is configured to:
  select a codeword of the first data unit;
  calculate a number of bits of the codeword that are different from an all-erased state; and
  compare the number of bits to a threshold to determine when the first data unit is unrecoverable.

15. A device comprising:
  a hardware controller configured to generate a data map of a data storage medium, the hardware controller configured to:
    scan data units on the data storage medium in an order opposite to a write order starting from a last data unit to identify a first data unit that is not fully erased;
    determine a codeword for the first data unit;
    determine a difference between the codeword and a specific state;
    compare the difference to a threshold; and
    assign a likely erased status to at least a sector of the first data unit when the first data unit is not fully erased and the difference is less than a threshold.

16. The data storage device of claim 15, wherein the difference represents a number of error bits of the codeword when the codeword is compared to an all-erased state and the hardware controller is further configured to determine an error recovery status of the sector of the first data unit based on the number of error bits.

17. The data storage device of claim 16, wherein the hardware controller assigns an error recovery status of unrecoverable to the sector when the number of error bits exceeds a recovery threshold.

18. The data storage device of claim 15, wherein the hardware controller is configured to:
  scan a next data unit of the data units on the data storage medium to determine if the next data unit is fully erased;
  determine a second codeword for the next data unit;
  determine a second difference between the second codeword and the specific state;
  compare the second difference to the threshold; and
  adjust a status of the first data unit to a fully erased status when the second difference exceeds the threshold or is unrecoverable.

19. The data storage device of claim 18, wherein the data storage medium comprises a multi-level cell flash memory device and wherein the hardware controller is configured with information about a number of levels in each cell of the multi-level cell flash memory device and an alignment of a block of data to be read.

20. The data storage device of claim 19, wherein the hardware controller is configured to identify the first data unit based on a count of a number of cells that appear to be erased.

* * * * *